United States Patent
Holm et al.

(10) Patent No.: US 9,736,627 B2
(45) Date of Patent: Aug. 15, 2017

(54) METHOD AND APPARATUS FOR DISCOVERY OF LOCATION CONTEXT IDENTIFIERS BASED ON APPROXIMATE LOCATION

(71) Applicant: QUALCOMM Incorporated, San Diego, CA (US)

(72) Inventors: Eric K. Holm, San Diego, CA (US); Arie Rahmat, San Diego, CA (US); Rajarshi Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/480,593

(22) Filed: Sep. 8, 2014

(65) Prior Publication Data

US 2014/0378164 A1  Dec. 25, 2014

Related U.S. Application Data

(62) Division of application No. 13/295,924, filed on Nov. 14, 2011, now abandoned.
(Continued)

(51) Int. Cl.
*H04W 24/00* (2009.01)
*H04W 4/02* (2009.01)
(Continued)

(52) U.S. Cl.
CPC ............ *H04W 4/02* (2013.01); *G01C 21/206* (2013.01); *H04L 29/12981* (2013.01);
(Continued)

(58) Field of Classification Search
CPC ....... H04W 4/02; H04W 4/021; H04W 4/043; H04W 4/20; H04W 4/028; H04W 4/025
(Continued)

(56) References Cited

U.S. PATENT DOCUMENTS

| 4,796,189 A | 1/1989 | Nakayama et al. |
| 5,906,654 A | 5/1999 | Sato |

(Continued)

FOREIGN PATENT DOCUMENTS

| CN | 101321078 A | 12/2008 |
| EP | 1260791 A1 | 11/2002 |

(Continued)

OTHER PUBLICATIONS

International Preliminary Report on Patentability—PCT/US2011/060811, The International Bureau of WIPO—Geneva, Switzerland, Jan. 28, 2013.
(Continued)

*Primary Examiner* — Jean Gelin
(74) *Attorney, Agent, or Firm* — Berkeley Law & Technology Group, LLP

(57) ABSTRACT

As part of a localized positioning solution, a mobile device may transmit a request message to a server to obtain information about location contexts near the mobile device. In response, the server may, in some implementations, transmit a response message back to the mobile device that identifies a list of nearby LCIs and an area that encompasses these LCIs. The mobile device may store the returned LCI information and the returned area information in corresponding databases for later use. In some implementations, time limits may be placed on the returned area information after which the information is deemed stale.

20 Claims, 7 Drawing Sheets

Related U.S. Application Data

(60) Provisional application No. 61/414,303, filed on Nov. 16, 2010.

(51) Int. Cl.

| | | |
|---|---|---|
| *G01C 21/20* | (2006.01) | |
| *H04W 4/04* | (2009.01) | |
| *H04W 4/20* | (2009.01) | |
| *H04L 29/08* | (2006.01) | |
| *H04L 29/12* | (2006.01) | |

(52) U.S. Cl.
CPC ............ *H04L 61/609* (2013.01); *H04L 67/18* (2013.01); *H04L 67/2852* (2013.01); *H04W 4/021* (2013.01); *H04W 4/04* (2013.01); *H04W 4/043* (2013.01); *H04W 4/20* (2013.01); *H04L 29/12047* (2013.01); *H04L 61/15* (2013.01)

(58) Field of Classification Search
USPC ......... 455/456.1, 456.2, 456.3, 456.5, 456.4, 455/456.6
See application file for complete search history.

(56) References Cited

U.S. PATENT DOCUMENTS

| | | | |
|---|---|---|---|
| 6,526,275 B1* | 2/2003 | Calvert | H04M 3/42348 455/418 |
| 7,706,328 B2 | 4/2010 | Mukkavilli et al. | |
| 7,738,884 B2 | 6/2010 | Cheung et al. | |
| 8,942,686 B2* | 1/2015 | Wright | H04M 3/42068 370/328 |
| 9,157,745 B2 | 10/2015 | Das et al. | |
| 2003/0017826 A1* | 1/2003 | Fishman | H04L 29/06 455/426.1 |
| 2003/0115186 A1 | 6/2003 | Wilkinson et al. | |
| 2004/0120323 A1 | 6/2004 | Viikari et al. | |
| 2004/0203885 A1 | 10/2004 | Quaid | |
| 2005/0198525 A1* | 9/2005 | Trossen | H04L 67/2857 726/22 |
| 2006/0200541 A1* | 9/2006 | Wikman | H04L 67/04 709/223 |
| 2006/0232472 A1 | 10/2006 | Roslak | |
| 2007/0049291 A1 | 3/2007 | Kim et al. | |
| 2007/0136086 A1 | 6/2007 | Luerssen | |
| 2007/0210937 A1 | 9/2007 | Smith et al. | |
| 2008/0133124 A1 | 6/2008 | Sarkeshik | |
| 2009/0023459 A1 | 1/2009 | Wigren | |
| 2009/0070293 A1 | 3/2009 | Vechersky | |
| 2009/0265236 A1* | 10/2009 | Schultz | G06Q 30/0255 705/14.53 |
| 2009/0281722 A1 | 11/2009 | Bitonti et al. | |
| 2010/0008337 A1 | 1/2010 | Bajko | |
| 2010/0325194 A1* | 12/2010 | Williamson | H04W 4/02 709/203 |
| 2011/0081883 A1* | 4/2011 | Daly | H04L 12/1895 455/404.1 |
| 2011/0081919 A1* | 4/2011 | Das | G01C 21/20 455/456.1 |
| 2011/0093458 A1 | 4/2011 | Zheng et al. | |
| 2011/0137881 A1 | 6/2011 | Cheng et al. | |
| 2011/0183626 A1* | 7/2011 | Das | G01S 5/0252 455/67.11 |
| 2011/0246148 A1* | 10/2011 | Gupta | H04W 64/00 703/2 |
| 2011/0256881 A1* | 10/2011 | Huang | G01S 5/0257 455/456.1 |
| 2012/0029817 A1* | 2/2012 | Khorashadi | G01C 21/20 701/451 |
| 2012/0122487 A1 | 5/2012 | Holm et al. | |
| 2012/0197524 A1 | 8/2012 | Beyeler et al. | |

FOREIGN PATENT DOCUMENTS

| | | |
|---|---|---|
| JP | H09196693 A | 7/1997 |
| JP | 2001134618 A | 5/2001 |
| JP | 2004094397 A | 3/2004 |
| JP | 2004361104 A | 12/2004 |
| JP | 2005535169 A | 11/2005 |
| JP | 3929894 B2 | 6/2007 |
| JP | 2008033043 A | 2/2008 |
| JP | 2010159980 A | 7/2010 |
| JP | 2013510307 A | 3/2013 |
| JP | 2013513165 A | 4/2013 |
| JP | 2013536631 A | 9/2013 |
| TW | I223100 B | 11/2004 |
| WO | WO-0217567 | 2/2002 |
| WO | WO-2004003703 A2 | 1/2004 |
| WO | WO-2007120940 | 10/2007 |
| WO | WO-2011056218 A2 | 5/2011 |
| WO | WO-2011068760 A2 | 6/2011 |
| WO | WO-2011088407 A1 | 7/2011 |
| WO | WO-2012015897 A1 | 2/2012 |

OTHER PUBLICATIONS

International Search Report and Written Opinion—PCT/US2011/060811—ISA/EPO—Mar. 20, 2012.
Taiwan Search Report—TW100141720—TIPO—Jan. 24, 2014.

* cited by examiner

METHOD AND APPARATUS FOR DISCOVERY OF LOCATION CONTEXT IDENTIFIERS BASED ON APPROXIMATE LOCATION

CLAIM OF PRIORITY UNDER 35 U.S.C. §119

This application is a divisional of and claims priority under 35 USC 120 to U.S. patent application Ser. No. 13/295,924, filed Nov. 14, 2011, entitled "METHOD AND APPARATUS FOR DISCOVERY OF LOCATION CONTEXT IDENTIFIERS BASED ON APPROXIMATE LOCATION," and also claims priority under 35 USC 119 to U.S. Provisional Application Ser. No. 61/414,303, filed Nov. 16, 2010, and entitled, "METHOD FOR DISCOVERY OF INDOOR LCI BASED ON APPROXIMATE LOCATION", which is assigned to the assignee hereof and which is incorporated herein by reference.

BACKGROUND

Field

Subject matter disclosed herein relates generally to positioning and, more specifically, to positioning that may be implemented for a localized environment.

Information

Modern positioning systems typically specify positions that are referenced to a global coordinate system. However, in some location based applications, the use of global coordinates may not be practical. For these applications, positioning solutions that reference a more local coordinate system may be desired. In general, it is desirable that such localized positioning solutions operate efficiently.

BRIEF DESCRIPTION OF THE FIGURES

Non-limiting and non-exhaustive implementations will be described with reference to the following figures, wherein like reference numerals refer to like parts throughout the various figures unless otherwise specified.

SUMMARY

Figure 1:
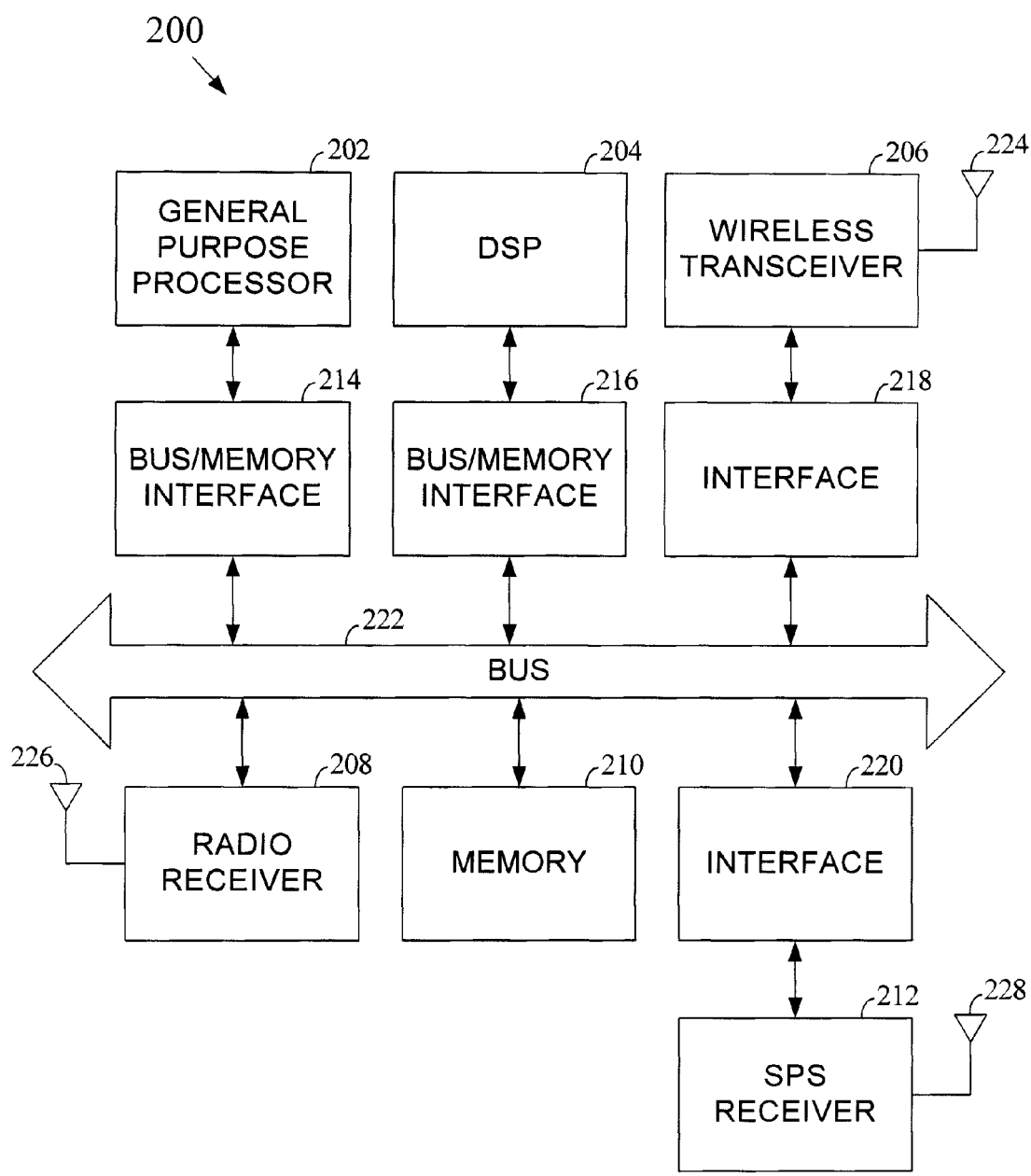
FIG. 1 is a block diagram illustrating an example mobile device architecture that may be used in an implementation.

In one implementation, a machine implemented method for managing location context identifier (LCI) requests received from a mobile device comprises: receiving a request message for one or more LCIs from a mobile device, the request message including location information; determining a region associated with the location information; and if there are no known LCIs within the region associated with the location information, transmitting a response message to the mobile device in response to the request message that indicates an unavailability of LCIs in the region.

In another implementation, a machine implemented method for obtaining location context identifier (LCI) information at a mobile device comprises: transmitting a request message for one or more location context identifiers (LCIs) from a mobile device, the request message including location information; and receiving a response message from a server in response to the request message indicating an unavailability of LCIs if there are no known LCIs within a region associated with the location information.

In another implementation, a machine implemented method comprises: determining at a mobile device that a location context identifier (LCI) is desired; searching a local database of the mobile device using an estimated location of the mobile device if the estimated location is within areas previously returned by one or more directory servers; and transmitting a request message for one or more LCIs from the mobile device if the estimated location is outside areas previously returned by the one or more directory servers.

In another implementation, an apparatus comprises: means for initiating transmission of a request message for one or more location context identifiers (LCIs) from a mobile device, the request message including location information; and means for processing a response message received from a server in response to the request message that indicates an unavailability of LCIs if the server is unable to determine any known LCIs identifying the region.

In another implementation, an article comprises: a non-transitory storage medium having machine-readable instructions stored thereon that are executable by a special purpose computing apparatus to: initiate transmission of a request message for one or more location context identifiers (LCIs) from a mobile device, the request message including location information; and process a response message received from a server in response to the request message that indicates an unavailability of LCIs, if the server is unable to identify any known LCIs identifying the region.

In another implementation, a mobile device comprises: a transceiver; and a processor to: initiate transmission of a request message through the transceiver for one or more location context identifiers (LCIs), the request message including at least an indication of an estimated location of the mobile device; and process a response message received at the transceiver from a server in response to the request message that indicates an unavailability of LCIs to identify at least one area at least in part overlapping a region including the estimated location, if the server is unable to identify any known LCIs identifying the region.

In another implementation, an apparatus comprises: means for determining at a mobile device that a location context identifier (LCI) is desired; means for searching a local database of the mobile device for LCI information using an estimated location of the mobile device if the estimated location is within areas previously returned by one or more directory servers; and means for initiating transmission of a request message for one or more LCIs from the mobile device if the estimated location is outside areas previously returned by the one or more directory servers, the request message including at least an indication of the estimated location of the mobile device.

In another implementation, an article comprises: a non-transitory storage medium having machine-readable instructions stored thereon which are executable by a special purpose computing apparatus to: determine at a mobile device that a location context identifier (LCI) is desired; search a local database of the mobile device for LCI information using an estimated location of the mobile device if the estimated location is within areas previously returned by one or more directory servers; and initiate transmission of a request message for one or more LCIs from the mobile device if the estimated location is outside areas previously returned by the one or more directory servers, the request message including at least an indication of the estimated location of the mobile device.

In yet another implementation, a mobile device comprises: a transmitter; and a processor to: determine that a location context identifier (LCI) is desired; search a local database of the mobile device for LCI information using an estimated location of the mobile device if the estimated location is within areas previously returned by one or more directory servers; and initiate transmission of a request message through the transmitter for one or more LCIs from the mobile device if the estimated location is outside areas previously returned by the one or more directory servers, the request message including at least an indication of the estimated location of the mobile device. It should be understood that the above identified embodiments and implementations are merely example embodiments and implementations, and that claimed subject matter is not limited in these respects.

DETAILED DESCRIPTION

Reference throughout this specification to "one implementation," "an implementation," "certain implementations," "some implementations," or "various implementations" means that a particular feature, structure, or characteristic described in connection with a described implementation may be included in at least one implementation of claimed subject matter. Thus, appearances of the phrase "in one example implementation," "in an example implementation," "in certain example implementations," "in some example implementations," or "in various example implementations" in various places throughout this specification are not necessarily all referring to the same implementation(s). Furthermore, particular features, structures, or characteristics may be combined in one or more implementations.

Mobile devices often have the ability to estimate location and/or position with a high degree of precision using any one of several technologies. These technologies may include, for example, satellite positioning systems (e.g., the Global Positioning System (GPS), etc.), advanced forward link trilateration (AFLT), multilateration, and/or others. Using high precision location information, applications for a mobile device may provide a user with different services such as, for example, vehicle/pedestrian navigation, location-based searching, and/or other services. Here, high precision location information may be processed according to a global coordinate system (e.g., latitude and longitude, earth centered xyz coordinates, etc). While the use of location information referenced to a global coordinate system may be useful in providing some services (e.g., outdoor vehicle navigation, etc.), such location information may be impractical for other types of services such as, for example, indoor pedestrian navigation. For these services, positioning solutions that reference a more local coordinate system may be used.

As used herein, the term "localized environment" may include any localized space where positioning services referenced to a local coordinate system may be desired including, for example, indoor areas, such as a building, and also outdoor areas or hybrid indoor/outdoor areas, such as an apartment complex, a golf course, or an airport. In some localized positioning solutions, a localized environment may include a number of locally defined areas, or location contexts, within which positioning takes place. These location contexts may be identified using location context identifiers (LCIs) during positioning related operations. In one example scenario, a building may represent a localized environment and each floor of the building may represent a different location context having a corresponding LCI. In some other scenarios, large floors of a building may be divided into multiple location contexts (e.g., terminals of an airport, etc.). Many other arrangements for defining location contexts may alternatively be used and may, for example, depend upon the specific geometry and/or complexity of the corresponding environment. A localized positioning solution may also include one or more directory servers that may be accessed by mobile devices to obtain information about a localized environment. LCIs may uniquely identify location contexts such as areas within a region.

In various implementations, a mobile device may desire LCI information for any of a number of different purposes. For example, LCIs may be used as handles for requesting additional information about location contexts from one or more servers. This additional information may include, for example, map information for a location context or information to be overlaid on a map (e.g., routes, paths, points of interest, locations of beacons or access points, heat map data, etc.). LCIs may also be used, for example, to obtain information for use in performing location-based applications, such as pedestrian navigation. Other uses of LCI information by mobile devices also exist.

FIG. 1 is a block diagram illustrating an example mobile device architecture 200 that may be used in an implementation. As illustrated, the mobile device architecture 200 may include, for example, a general purpose processor 202, a digital signal processor 204, a wireless transceiver 206, a radio receiver 208, a memory 210, and an SPS receiver 212. A bus 222 or other alternative structure or structures may be provided for establishing interconnections between various components of the architecture 200. In the illustrated implementation, one or more interfaces 214, 216, 218, 220 may be provided between selected components and bus 222. The wireless transceiver 206, the radio receiver 208, and the SPS receiver 212 may each be coupled to one or more antennas 224, 226, 228, and/or other transducers, to facilitate the transmission and/or reception of wireless signals.

The general purpose processor 202 and the digital signal processor 204 are digital processing devices that are capable of executing programs to provide one or more functions and/or services to a user. One or both of these processors 202, 204 may be used, for example, to execute an operating system of a corresponding wireless device. One or both of these processors 202, 204 may also be used, for example, to execute user application programs including, for example, location-based applications that may rely on the availability of an accurate position estimate. In addition, one or both of these processors 202, 204 may be used to implement, either partially or fully, one or more of the positioning related processes or techniques described herein in some implementations. It should be appreciated that other forms of digital processing devices may additionally or alternatively be used to perform some or all of the described functions in various implementations including, for example, one or more controllers, microcontrollers, application specific integrated circuits (ASICs), field programmable gate arrays (FPGAs), programmable logic arrays (PLAs), programmable logic devices (PLDs), reduced instruction set computers (RISCs), and/or others, including combinations of the above.

Wireless transceiver 206 may include any type of transceiver that is capable of supporting wireless communication with one or more remote wireless entities. In various implementations, wireless transceiver 206 may be configured in accordance with one or more wireless networking standards and/or wireless cellular standards. In some implementations, multiple wireless transceivers may be provided to support operation with different networks or systems in a surrounding environment. During mobile device operation, wireless transceiver 206 may be called upon to communicate with a base station or access point of a wireless communication system or network. Radio receiver 208 may be operative for receiving signals from one or more sensors of a sensor network or other transmitting nodes within a surrounding environment.

Memory 210 may include any type of device or component, or combination of devices and/or components, that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

SPS receiver 212 may include any type of receiver capable of receiving SPS signals from positioning satellites and processing the signals to provide one or more position estimates for a mobile device. SPS receiver 212 may be configured to operate with any existing or future SPS system including, for example, the Global Positioning System (GPS), the GLONASS system, the Compass system, the Galileo system, the IRNSS system, the GNSS system and other systems that use Satellite Based Augmentation Systems (SBASs) and/or Ground Based Augmentations Systems (GBASs), and/or other satellite navigation systems. In some implementations, one or more of the processes or techniques described herein may be implemented, either partially or fully, within SPS receiver 212 or a similar structure. It should be appreciated that the mobile device architecture 200 of FIG. 1 represents one possible example of an architecture that may be used in a implementation. Other architectures may alternatively be used. It should also be appreciated that all or part of the various devices, processes, or methods described herein may be implemented using any combination of hardware, firmware, and/or software.

Figure 2:
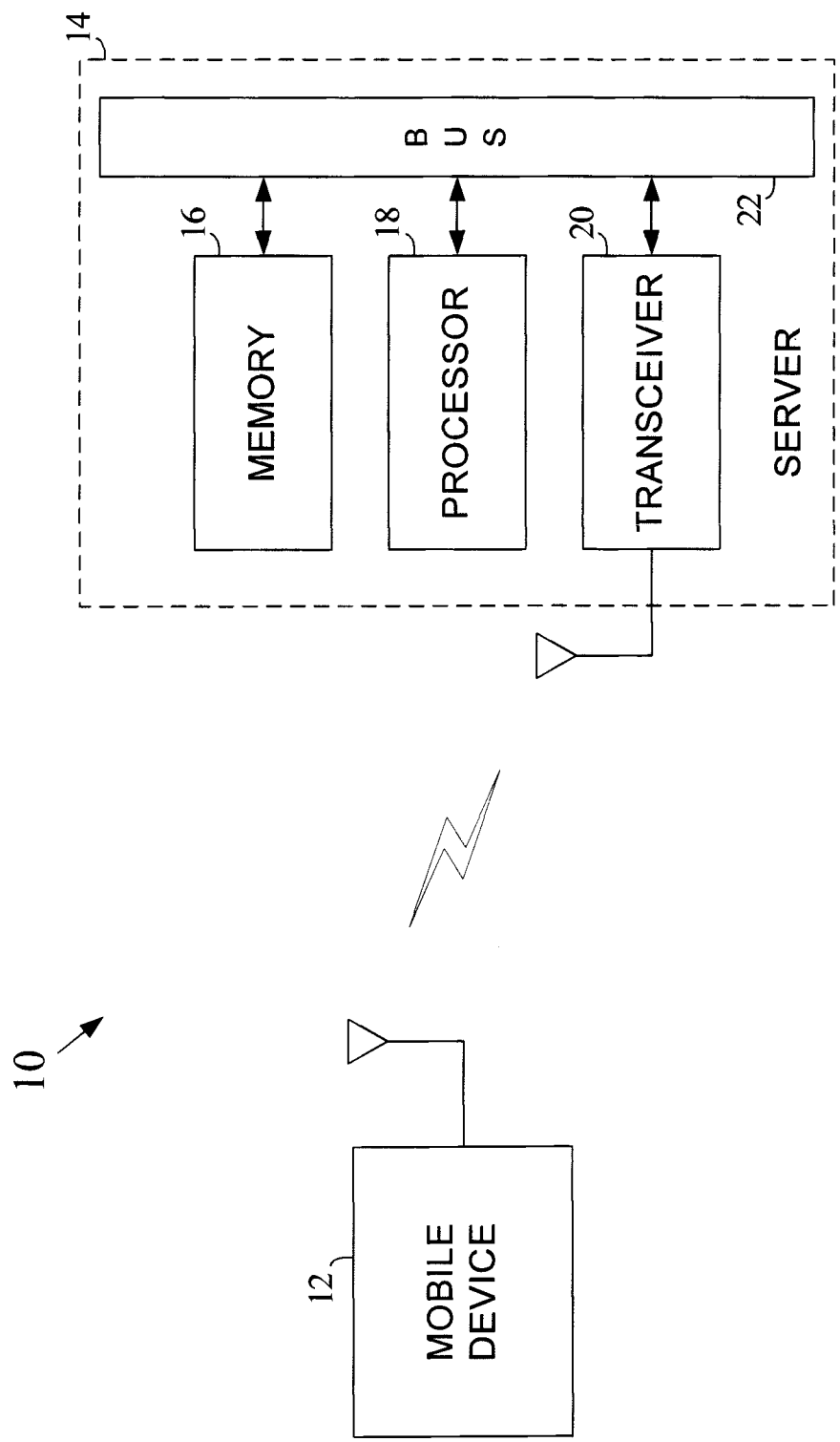
FIG. 2 is a block diagram illustrating an example communications arrangement in accordance with an implementation.

FIG. 2 is a block diagram illustrating an example communications arrangement 10 in accordance with an implementation. As illustrated, a mobile device 12 may wirelessly communicate with a server 14 (e.g., a directory server, etc.) to obtain information about a localized environment that mobile device 12 is operating within or is approaching. As will be discussed in greater detail, this information may include, among other things, LCIs identifying location contexts of the localized environment that are proximate to mobile device 12. Mobile device 12 may then use these LCIs to perform, for example, positioning functions or position related applications (e.g., pedestrian navigation, etc.). Mobile device 12 may utilize mobile device architecture 200 of FIG. 1 or a similar architecture in some implementations. In the illustrated implementation, server 14 may include: a memory 16, a processor 18, a wireless transceiver 20, and a bus 22. These elements may be similar in structure and/or function to the corresponding elements of FIG. 1 described above. Memory 16 may include any type of device or component, or combination of devices and/or components, that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data. Other server architectures may alternatively be used. In some implementations, wireless transceiver 20 may be located outside of server 14. For example, in one possible approach, server 14 may communicate with wireless transceiver 20 via a wired network (e.g., an intranet, the Internet, etc.). Server 14 may include, for example, a network interface card (NIC) or similar functionality to facilitate communication over the wired network.

In a localized positioning solution, the number of directory servers may be limited and these servers may need to be shared by a large number of mobile devices. If the number of devices attempting to access a directory server at a particular time is large, processing delays may occur that may compromise the performance of, for example, position-based user applications. Techniques, processes, and structures are provided herein that may reduce the frequency of server accesses by mobile devices in a localized positioning solution. In some instances, these reductions in communication activity between mobile devices and directory servers may result in power savings within a mobile device by, for example, reducing transceiver activity. Various described approaches may also, in some implementations, decrease a time-to-fix (TTF) at a mobile device.

In at least one implementation, mobile device 12 may, after determining that an LCI is desired, transmit a request message to server 14 to identify one or more LCIs identifying areas in a vicinity of mobile device 12. As part of the request message, mobile device 12 may include an indication of its estimated location or some other location information. Any format for indicating an estimated location may be used. In one possible approach, a position and an uncertainty value may be used to indicate an estimated location. The position may identify a central point and the uncertainty may identify an area about the central point (e.g., a radius defining a circular area, information defining an ellipse or some other shape, etc.) where it is believed mobile device 12 is likely to be. In response to the request message, server 14 may search a database of LCIs to find one or more LCIs identifying areas that are close to the estimated location of mobile device 12.

Figure 3:
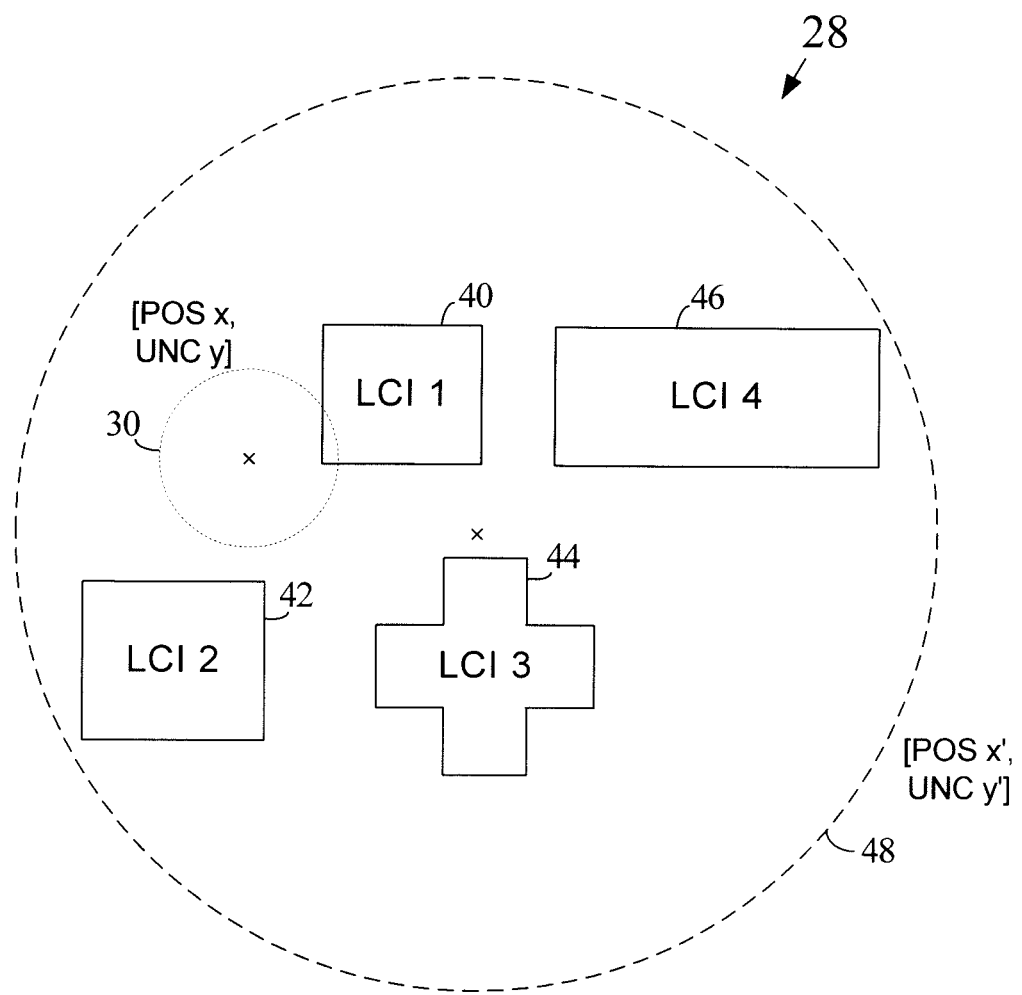
FIG. 3 is a schematic diagram illustrating an example LCI scenario that may exist about a mobile device at a particular point in time in accordance with an implementation.

FIG. 3 is a schematic diagram illustrating an example LCI scenario 28 that may exist about mobile device 12 at a particular point in time in accordance with an implementation. As shown, mobile device 12 may have an estimated location 30 having position x with uncertainty y. As used herein, a position x with uncertainty y may be referred to as a "key." A number of different techniques may be used by mobile device 12 to estimate its current location. For example, in one implementation, mobile device 12 may use a last-known satellite positioning system (SPS) fix as a current estimated location (e.g., a last-known Global Positioning System (GPS) fix, etc.). In another implementation, mobile device 12 may scan wireless network access points or base stations (e.g., IEEE 802.11 access points, cellular base stations, etc.) in a surrounding area to develop an estimated location. Mobile device 12 may, for example, use a location of a cell or coverage area of a currently associated access point or base station as an estimated location in some implementations. In some other implementations, mobile device 12 may use input from a user to determine a location estimate. In still other implementations, an on-board camera of mobile device 12 may be used to capture images of a surrounding environment from which a location estimate may be implied. Many other techniques, including combinations of techniques, may be used to determine a location estimate for mobile device 12.

Upon receiving a request message, server 14 may use estimated location 30 (or other location information) to search for LCIs identifying areas near mobile device 12. With reference to FIG. 3, server 14 may find, for example, first LCI 40, second LCI 42, third LCI 44, and fourth LCI 46 during a database search. Server 14 may then transmit a response message to mobile device 12 that includes a list of these LCIs. In some implementations, the list of LCIs may also include location contexts identified by the listed LCIs, thus allowing mobile device 12 to determine which identified area is closest. In addition to the list of LCIs, the response message may include an indication of an area 48 that encompasses location contexts identified by the LCIs on the list as well as the estimated location 30 of mobile device 12. In one possible approach, as illustrated in FIG. 3, area 48 may be described as a position x' and an uncertainty y' that defines a circle (where x' forms the center and y' defines a radius). As used herein, a position x' and uncertainty y' may be referred to as an "alternate key." In other implementations, other shapes and/or other formats for describing such an area may be used. In at least one implementation, all of the LCIs identifying areas that are encompassed by area 48 are included on the list of LCIs in the response message.

After mobile device 12 receives the response message, it may cache the LCI information of the message within a local database. The local database may be stored within, for example, memory 210 of FIG. 1 or some other digital data storage structure. In some implementations, mobile device 12 may use the LCI information from the response message to obtain additional information about the listed LCIs. For example, mobile device 12 may contact map servers to request information on, for example, access points (APs), base stations (BSs), or other wireless network nodes associated with location contexts identified by listed LCIs. This additional information may also be cached in the local database. Mobile device 12 may also cache information about area 48 within a "previously returned areas" database. The previously returned areas database may track areas for which LCI information was previously provided to mobile device 12 from server 14 and/or other servers. The previously returned areas database may be stored within, for example, memory 210 of FIG. 1 or some other digital data storage structure.

In certain implementations, if mobile device 12 determines that an LCI is desired, it may first check its previously returned areas database using an estimated location of mobile device 12 before any request messages are transmitted to a server. If the previously returned areas database indicates that the estimated location is within a previously returned area, the mobile device 12 may search its local database for LCIs using the estimated location as, for example, a key. Because the estimated location is within a previously returned area, the mobile device 12 does not need to contact server 14 to request an LCI. This tends to reduce communication traffic levels experienced by server 14.

In some instances, after receiving an LCI request message, server 14 may find that there are no known LCIs covering an area in a vicinity of mobile device 12. In such a case, server 14 may return a response message that includes an empty list of LCIs. In addition, in some implementations, server 14 may return an indication of an area within which the mobile device is not to transmit a subsequent request message. In certain implementations, the area may be specified as a position x' and an uncertainty y'. In one possible approach, the uncertainty y' of the returned area information may be made as large as possible without encompassing areas identified by any known LCIs. For example, in one possible scenario, if server 14 finds that there are no LCIs identifying areas in a current city of a location of the mobile device, then the uncertainty of the returned area information may be made large enough to encompass the entire city. In other implementations, limits may be placed on the maximum size of the returned uncertainty information. The position x' of the returned area information may, in some implementations, be made the same as the position x of the estimated location of mobile device 12 if no LCIs identifying nearby areas are found. Other formats for describing returned area information in a response message when no LCIs identifying nearby areas are found may alternatively be used.

If mobile device 12 receives a response message having an empty LCI list, it may cache the returned area information into the previously returned areas database. This response message information may be utilized to prevent mobile device 12 from sending extraneous LCI requests to directory servers in the future if an estimated location of mobile device 12 is within the returned area. If the uncertainty of the returned area information is made large enough to encompass an entire city, the mobile device 12 may not send any LCI request messages while it is inside the city limits as such LCI request messages would most likely be unfruitful.

Over time, new LCIs may be added to identify areas in a localized environment. In some implementations, mechanisms are provided that may allow a mobile device to become aware of a new LCI even if it identifies an area that is located within an area listed in the previously returned areas database. This may be done by, for example, applying a time limit to information within the previously returned areas database that prevents the information stored therein from becoming stale. In one possible approach, server 14 may associate a time-to-live (TTL) value to an area indication it returns to mobile device 12 in a response message. After receiving the response message, mobile device 12 may record the time that the response message was received and cache the area information in the previously returned areas database. Mobile device 12 may then track the age of the area information within the previously returned areas database. As the age of the area information reaches the TTL value, the information may be tagged as stale, after which it is no longer used. In certain implementations, the returned area information may be deleted from the previously returned areas database as a result of becoming stale. In an alternative approach, mobile device 12 may apply its own TTL value to area information in a newly received response message. Alternative techniques for time limiting area information within a previously returned areas database may be used in other implementations.

Figure 4:
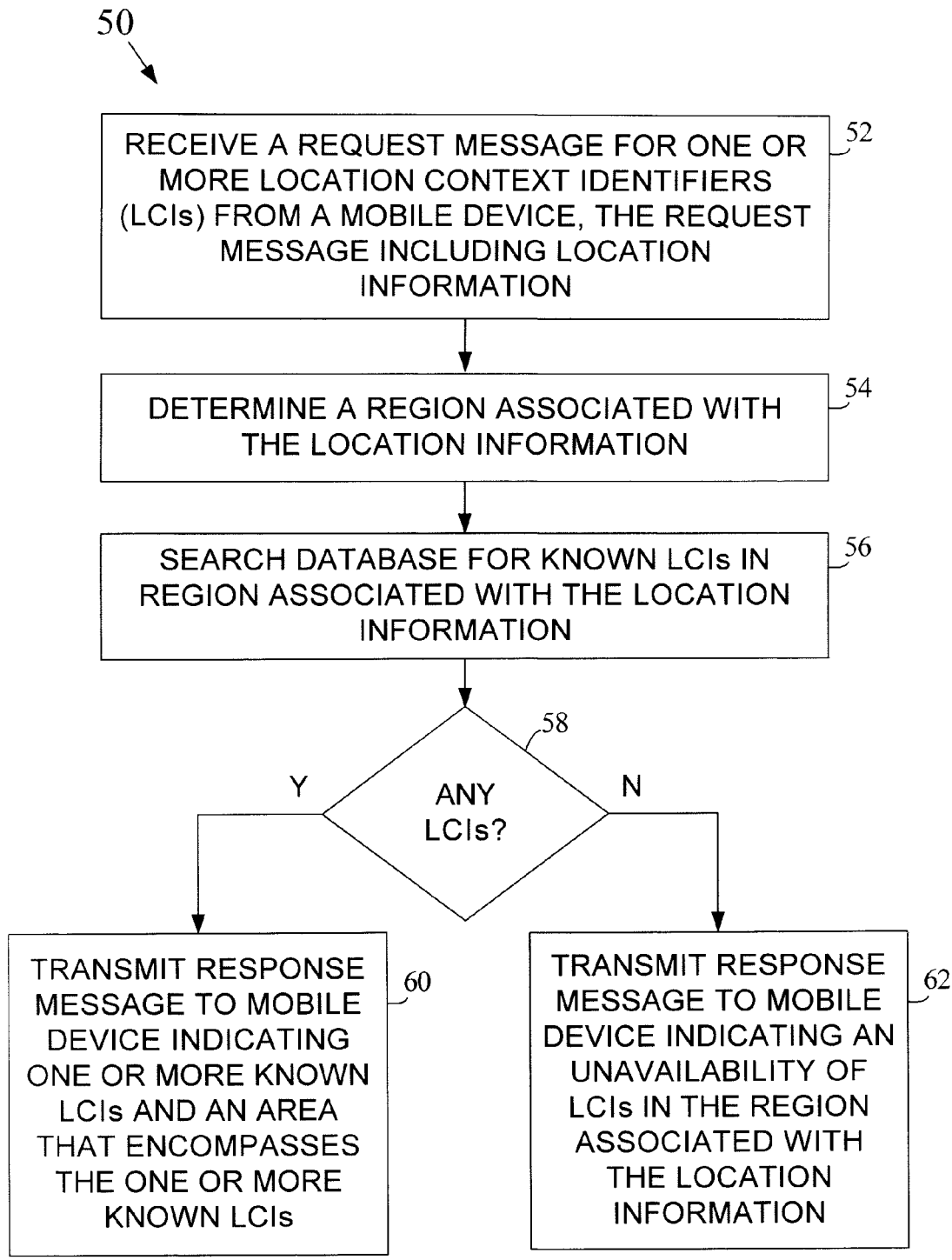
FIG. 4 is a flowchart illustrating a method for processing a request message received from a mobile device in accordance with an implementation.

FIG. 4 is a flowchart illustrating a method 50 for processing a request message received from a mobile device in accordance with an implementation. The method 50 may be implemented by, for example, a server or other structure associated with a localized positioning solution (e.g., server 14 of FIG. 2, etc.). A request message for one or more LCIs is first received from a mobile device, the request message including location information (block 52). The location information may include information collected and/or generated by the mobile device that is related in some manner to the location of the mobile device. In this manner, the location information may include, for example, an estimated location of the mobile device, locations of wireless transceivers (e.g., base stations, access points, etc.) visible to the mobile device, identities of visible transceivers, identities of satellites visible to the mobile device, a service set identifier (SSID), a basic service set identifier (BSSID), a base station identifier (BSID), sensor readings such as dead reckoning information, and/or other location information. In at least one implementation, the location information may include, for example, a position x and an uncertainty y or some other format for describing an estimated location of the mobile device. After the request message is received, a region associated with the location information may be determined (block 54). The region associated with the location information may include a region within which known LCIs will be searched for the mobile device. For example, if the location information includes an estimated location of the mobile device, the region may include a region that encompasses the estimated location. In some implementations, the region may be defined as a region including all points within a certain distance of a center of the estimated location. Other techniques for determining the region may alternatively be used. If the request message includes other types of location information (e.g., locations and identities of visible transceivers, etc.), the determination of a region may involve, for example, first generating an estimate of the location of the mobile device.

A database may be searched for known LCIs in the region associated with the location information (block 56). If one or more known LCIs are found (block 58-Y), a response message may be transmitted to the mobile device that lists the one or more known LCIs and also indicates an area that encompasses the one or more known LCIs (block 58). In at least one implementation, this area may be an area that encompasses the one or more known LCIs and also an estimated location of the mobile device. In some implementations, the returned area may be specified as a position x' and an uncertainty y'. Other formats for describing the returned area may alternatively be used. In some implementations, a TTL indication may be included in the response message that indicates a time period after which LCI information (e.g., the list of LCIs, the area information, and/or other LCI information) in the message is deemed stale. As described previously, in at least one implementation, all known LCIs identifying areas that are encompassed by the returned area are included in the list of LCIs in the response message. The term "known" may be used here to indicate LCIs that are known by the server or other structure implementing the method 50 (e.g., LCIs recorded within a database of server 14 of FIG. 2, etc.). As will be described in greater detail, upon receipt of a response message, a mobile device may store area information from the message in a returned areas database in some implementations.

If there are no known LCIs in the region (block 58-N), a response message may be transmitted to the mobile device that indicates an unavailability of LCIs (block 60). In one possible approach, the response message may include, for example, an empty list of LCIs. Other techniques for indicating an unavailability of LCIs may alternatively be used. In some implementations, the response message may also indicate an area that encompasses the region associated with the location information and that also includes no known LCIs. This area may be larger than the region associated with the location information. The area may be selected based, at least in part, on information within, for example, an LCI database accessible by a server. In certain implementations, the area may be specified in the response message as a position x' and an uncertainty y'. In one possible approach, for example, the uncertainty y' of the returned area information may be made as large as possible without encompassing any areas identified by known LCIs (although size limits may be used in some implementations). Other formats for describing area information in a response message if no LCIs are found may alternatively be used. As will be described in greater detail, upon receipt of a response message, a mobile device may store area information from the message in a returned areas database in some implementations. The response message may also include a TTL indication indicating a time period after which the area indication is considered stale.

Figure 5:
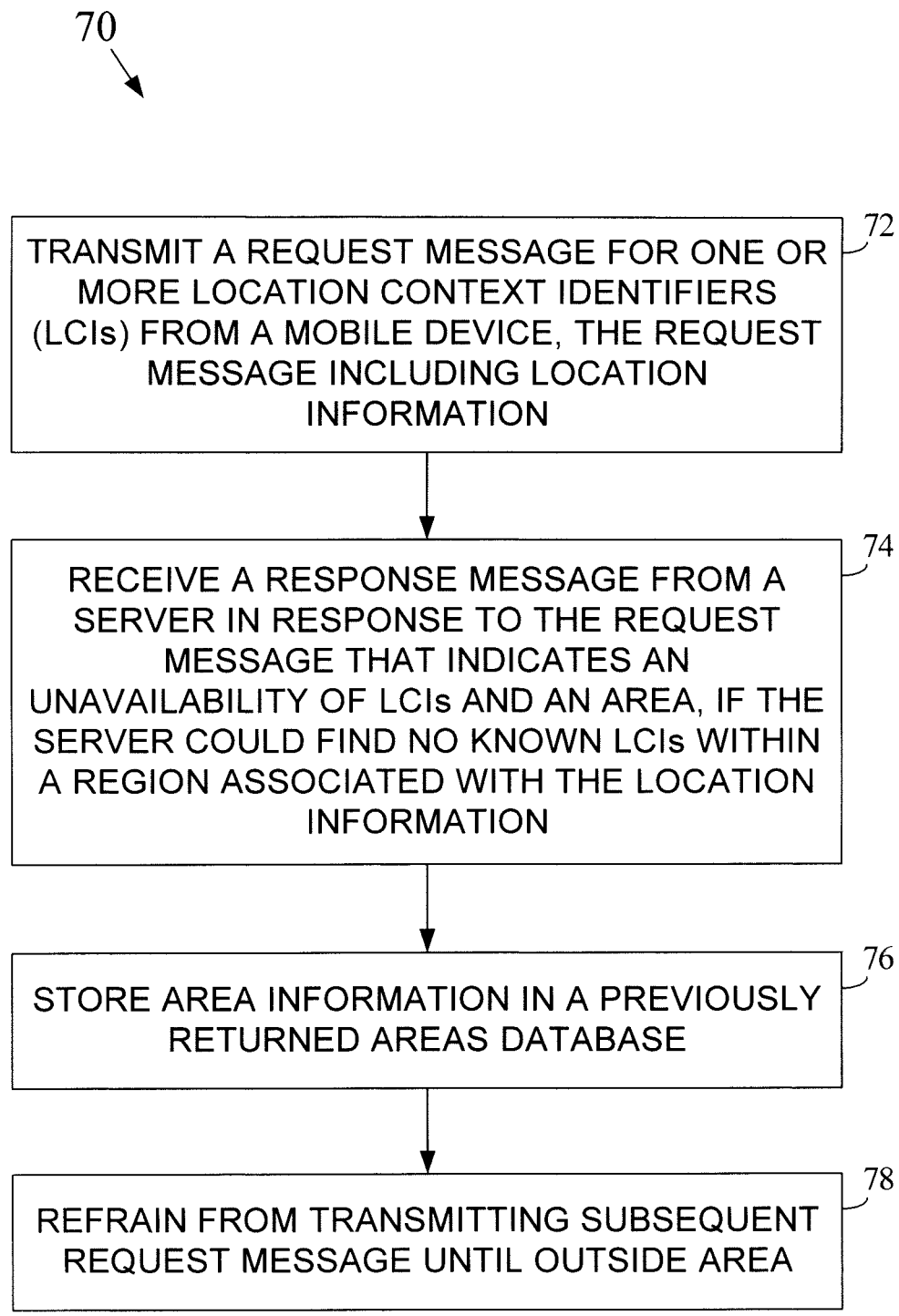
FIG. 5 is a flowchart illustrating a method for obtaining LCI information at a mobile device in accordance with an implementation.

FIG. 5 is a flowchart illustrating a method 70 for obtaining LCI information at a mobile device in accordance with an implementation. A request message for one or more location context identifiers (LCIs) is first transmitted from a mobile device, where the request message includes location information (block 72). The content of the location information has been described above. A response message may then be received from a server in response to the request message that indicates an unavailability of LCIs, if the server could find no known LCIs within a region associated with the location information (block 74). The region associated with the location information has been described above. In addition to the LCI unavailability indication, the response message may also include area information as described previously. In some implementations, the area information may be stored by the mobile device in a previously returned areas database associated with the mobile device (block 76). After receiving the response message, the mobile device may refrain from transmitting a subsequent request message until the device leaves the indicated area (block 78). In some implementation, some or all of the area information stored within the previously returned areas database may be time limited (e.g., the information may be considered stale after a specific time period has elapsed).

Figure 6:
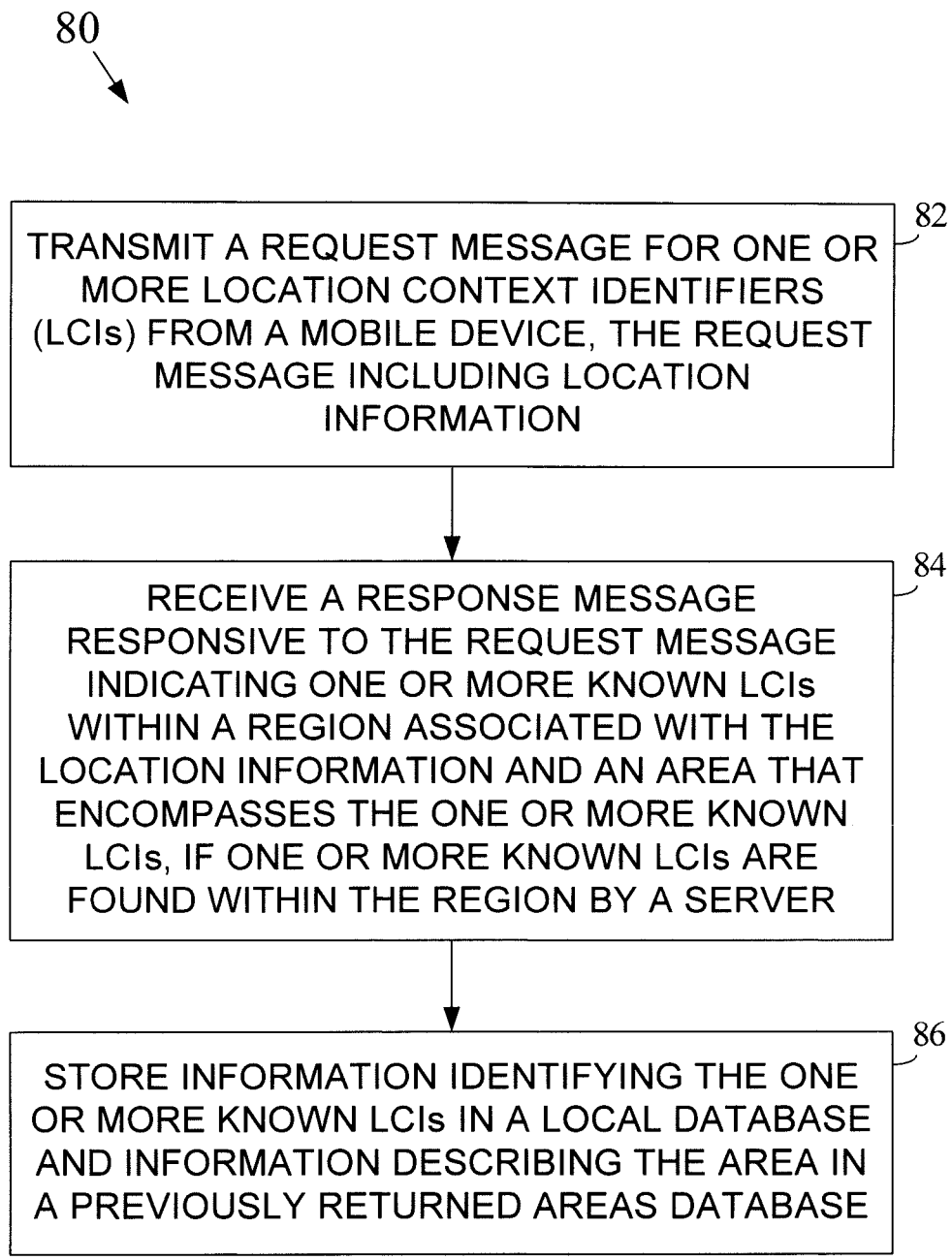
FIG. 6 is a flowchart illustrating a method for obtaining LCI information at a mobile device in accordance with an implementation.

FIG. 6 is a flowchart illustrating a method 80 for obtaining LCI information at a mobile device in accordance with an implementation. A request message for one or more LCIs may first be transmitted from a mobile device, where the request message includes location information (block 82). A response message may then be received at the mobile device in response to the transmitted request message indicating one or more known LCIs within a region associated with the location information and an area that encompasses the one or more known LCIs, if one or more known LCIs are found within the region by a server (block 84). In response to receipt of the response message, the mobile device may store area information in a previously returned areas database and LCI information in a local database (block 86). In some implementations, a TTL indication may be included in a response message to indicate a time period after which the returned area information and/or the LCI indications in the message is deemed stale. The mobile device may record this TTL information and delete or tag as stale the corresponding stored information at an appropriate time. In various implementations, the area indicated in the response message that encompasses the one or more known LCIs may also encompass an estimated location of the mobile device.

Figure 7:
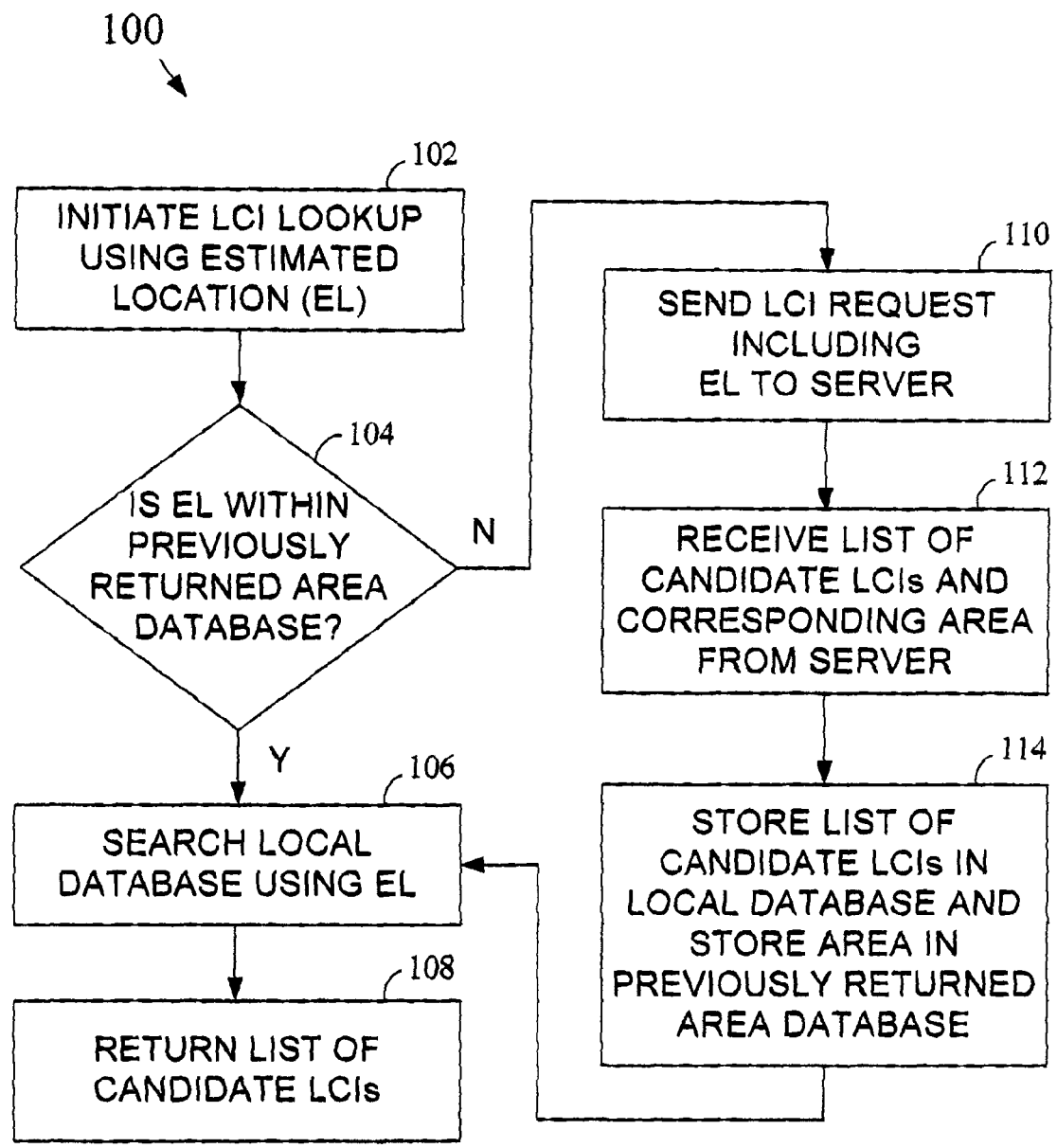
FIG. 7 is a flowchart illustrating a method for operating a mobile device in accordance with an implementation.

FIG. 7 is a flowchart illustrating a method 100 for operating a mobile device in accordance with an implementation. If a mobile device determines that an LCI is desired, an LCI lookup procedure may be initiated (block 102). It is first determined whether an estimated location of the mobile device is within areas specified within a previously returned areas database (block 104). If the estimated location is within the previously returned areas database (block 104-Y), then the mobile device may search a local database for LCI information using the estimated location (block 106). A list of candidate LCIs may then be returned and a directory server does not need to be contacted (block 108). If the estimated location is not within the previously returned areas database (block 104-N), then the mobile device may transmit an LCI request message that includes an indication of the estimated location to a directory server (block 110). A response message may then be received from the server that includes a list of candidate LCIs and an indication of a corresponding area that encompasses areas identified by the LCIs in the list (block 112). The mobile device may then store the LCI information from the list in a local database and the area information in the previously returned areas database (block 114). The mobile device may also transmit information request messages to other servers at this time to obtain additional information about the LCIs on the list. This additional information may also be stored within the previously returned areas database. The mobile device may then search the local database using the estimated location (block 106) and return a list of candidate LCIs (block 108).

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein can be implemented by various means depending upon the application. For example, these methodologies can be implemented in hardware, firmware, software, or a combination thereof. For hardware implementations, processing may be implemented within, for example, one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, methodologies can be implemented with modules (e.g., procedures, functions, and so on) that perform functions described herein. Any machine readable digital medium tangibly embodying instructions can be used in implementing methodologies described herein. For example, software codes can be stored in a storage medium and executed by a processing unit. Storage can be implemented within a processing unit or external to a processing unit. As used herein, the terms "storage medium," "storage media," "storage device," "digital storage," or the like refer to any type of long term, short term, volatile, nonvolatile, or other storage structures and are not to be limited to any particular type of memory or number of memories, or type of media upon which data is stored.

If implemented in firmware and/or software, the functions may be stored as one or more instructions or code on a computer readable medium. Examples include computer readable media encoded with a data structure and computer readable media encoded with a computer program. Computer-readable media may take the form of an article of manufacture. Computer-readable media includes physical computer storage media. A computer readable storage medium may be any available digital medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Techniques described herein may be implemented in conjunction with various wireless communication networks such as, for example, a wireless wide area network (WWAN), a wireless local area network (WLAN), a wireless personal area network (WPAN), and so on. The terms "network" and "system" may be used interchangeably. The terms "position" and "location" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as, for example, cdma2000, Wideband-CDMA (W-CDMA), and so on. Cdma2000 may include IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma 2000 is described in documents from a consortium named "3rd Generation Partnership Project 2" (3GPP2). 3GPP and 3GPP2 documents are publicly available. A WLAN may be, for example, an IEEE 802.11x network or some other type of network. A WPAN may be, for example, a Bluetooth network, an IEEE 802.15x network, or some other type of network. Techniques disclosed herein may also be implemented in conjunction with any combination of WWAN, WLAN, and/or WPAN.

As used herein, the term "mobile device" refers to a device such as a cellular telephone, smart phone, or other wireless communication device; a personal communication system (PCS) device; a personal navigation device (PND); a Personal Information Manager (PIM); a Personal Digital Assistant (PDA); a laptop computer; a tablet computer; a portable media player; or other suitable mobile or portable device which is capable of receiving wireless communication and/or navigation signals. The term "mobile device" is also intended to include devices which communicate with a personal navigation device (PND), such as by short-range wireless, infra-red, wireline connection, or other connection, regardless of whether satellite signal reception, assistance data reception, and/or position-related processing occurs at the device or at the PND. Also, the term "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

Designation that something is "optimized," "required," or other similar designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

In the preceding detailed description, numerous specific details have been set forth to provide a thorough understanding of claimed subject matter. However, it will be understood by those skilled in the art that claimed subject matter may be practiced without these specific details. In other instances, methods or structures that would be known by one of ordinary skill have not been described in detail so as not to obscure claimed subject matter.

Some portions of the preceding detailed description have been presented in terms of logic, algorithms, or symbolic representations of operations on binary states stored within a storage medium of a specific apparatus or special purpose computing device or platform. In the context of this particular specification, the term specific apparatus or the like may include a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," "estimating," "initializing," or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

A computer-readable storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to particular disclosed examples, but that such claimed subject matter may also include all aspects falling within the scope of appended claims, and equivalents thereof.

What is claimed is:

1. A machine implemented method for managing location context identifier (LCI) requests received from a mobile device, comprising:
   receiving a request message for one or more LCIs from said mobile device, said request message comprising location information;
   determining a region associated with said location information; and
   at least partially in response to determining that there are no known LCIs within said region associated with said location information, determining an area which is larger than and which encompasses said region and for which there are no known LCIs, and transmitting a response message to said mobile device that indicates an unavailability of LCIs within said area.

2. The method of claim 1, wherein said response message comprises an empty list of LCIs.

3. The method of claim 1, further comprising:
   determining said area that encompasses said region associated with said location information and that includes no known LCIs, wherein said response message comprises an indication of said area.

4. The method of claim 3, further comprising:
   determining said area that encompasses said region associated with said location information comprises identifying an area that is as large as possible, up to a limit, without encompassing any known LCIs.

5. The method of claim 3, wherein:
   said response message comprises a time-to-live indication identifying a time after which said indication of said area is considered stale.

6. The method of claim 1, wherein:
   said location information comprises an estimate of a location of said mobile device.

7. The method of claim 6, wherein:
   said estimate of said location of said mobile device comprises a position indication and an uncertainty value.

8. The method of claim 1, further comprising:
   at least partially in response to determining that there are one or more known LCIs within said region associated with said location information, transmitting a response message to said mobile device in response to said request message that comprises a list of said one or more known LCIs.

9. The method of claim 8, wherein:
   said response message that comprises said list of said one or more known LCIs also comprises an indication of an area that encompasses said one or more known LCIs.

10. The method of claim 1, wherein said location information comprises an estimated location, and wherein said region comprises points within a certain distance of a center of said estimated location.

11. A machine implemented method, by a mobile device, comprising:
    determining at said mobile device that a location context identifier (LCI) is desired;
    searching a local database of said mobile device for one or more LCIs using an estimated location of said mobile device at least partially in response to determining that said estimated location is within areas previously returned by one or more directory servers, wherein said local database is stored within a memory of said mobile device; and
    transmitting a request message for the one or more LCIs from said mobile device at least partially in response to said estimated location being outside areas previously returned by said one or more directory servers.

12. The method of claim 11, further comprising:
    after transmitting said request message, receiving a response message from a first directory server responsive to said request message, said response message comprising a list of LCIs identifying areas in a vicinity of said estimated location.

13. The method of claim 12, wherein:
    said response message further comprises an indication of an area that encompasses said estimated location and said LCIs in said list of LCIs if said list of LCIs has at least one LCI.

14. A machine-implemented comprising:
    determining at a mobile device that a location context identifier (LCI) is desired;
    searching a local database of said mobile device using an estimated location of said mobile device at least partially in response to determining that said estimated location is within areas previously returned by one or more directory servers; and
    transmitting a request message for one or more LCIs from said mobile device at least partially in response to said estimated location being outside areas previously returned by said one or more directory servers;
    wherein after transmitting said request message, receiving a response message from a first directory server responsive to said request message, said response message comprising a list of LCIs identifying areas in a vicinity of said estimated location and comprising an indication of an area that encompasses said estimated location and said LCIs in said list of LCIs if said list of LCIs has at least one LCI, and
    wherein after receiving said response message, storing said area in a previously returned areas database and storing LCI information from said list of LCIs in said local database.

15. The method of claim 14, wherein:
    area information stored within said previously returned areas database is time limited.

16. A machine-implemented method comprising:
    determining at a mobile device that a location context identifier (LCI) is desired;
    searching a local database of said mobile device using an estimated location of said mobile device at least partially in response to determining that said estimated location is within areas previously returned by one or more directory servers; and transmitting a request message for one or more LCIs from said mobile device at least partially in response to said estimated location being outside areas previously returned by said one or more directory servers;

wherein after transmitting said request message, receiving a response message from a first directory server responsive to said request message, said response message comprising a list of LCIs identifying areas in a vicinity of said estimated location and further comprising an empty list of LCIs at least partially in response to said first directory server not finding any LCIs identifying areas in said vicinity of said estimated location.

17. The method of claim 16, wherein:
said response message further comprises an indication of an area within which said mobile device is not to transmit a subsequent request message if said list of LCIs is empty.

18. The method of claim 17, further comprising:
after receiving said response message, storing said indication of said area within which said mobile device is not to transmit a subsequent request message in a previously returned areas database.

19. An article comprising: a non-transitory storage medium having machine-readable instructions stored thereon which are executable by a special purpose computing apparatus to:
determine, at a mobile device, whether a location context identifier (LCI) is desired;
search a local database of said mobile device for LCI information comprising one or more LCIs using an estimated location of said mobile device at least partially in response to determining that said estimated location is within areas previously returned by one or more directory servers, wherein said local database is stored within a memory of said mobile device; and
initiate transmission of a request message for the one or more LCIs from said mobile device at least partially in response to determining that said estimated location is outside areas previously returned by said one or more directory servers, said request message comprising at least an indication of said estimated location of said mobile device.

20. A mobile device comprising:
a transmitter; and
a processor to:
determine whether a location context identifier (LCI) is desired;
search a local database of said mobile device for LCI information comprising one or more LCIs using an estimated location of said mobile device at least partially in response to determining that said estimated location is within areas previously returned by one or more directory servers, wherein said local database is stored within a memory of said mobile device; and
initiate transmission of a request message through said transmitter for the one or more LCIs from said mobile device at least partially in response to said estimated location being outside areas previously returned by said one or more directory servers, said request message comprising at least an indication of said estimated location of said mobile device.

* * * * *